United States Patent Office 3,290,389
Patented Dec. 6, 1966

3,290,389
PROCESS FOR THE PRODUCTION OF ORTHO-SUBSTITUTED PHENOLS
Willi Hahn, Cologne-Stammheim, Germany, assignor to Farbenfabriken Bayer Aktiengesellschaft, Leverkusen, Germany, a corporation of Germany
No Drawing. Filed Jan. 18, 1962, Ser. No. 167,169
Claims priority, application Germany, Jan. 25, 1961, F 33,054
10 Claims. (Cl. 260—619)

The present invention relates to a process for the production of alkylated phenols, and more particularly to the production of phenols which are alkylated in the ortho-position to the hydroxyl group, from phenols and olefins using aluminum oxide catalysts.

It is known that alkylphenols may be prepared generally by reacting phenols with olefins in the presence of catalysts. The catalysts mainly used for this purpose are acid in nature, such as sulphuric acid, hydrochloric acid, phosphoric acid, salts which are acid in reaction, fuller's earth activated by acids, and the like. Lewis acids (such as aluminum chloride and boron fluoride) may also be used. All these catalysts, however, have the disadvantage that they are strongly corrosive, so that they require reaction vessels made of special materials. In addition, they generally lead to the formation of mixtures of various alkylation products. The removal of the catalysts from the reaction mixture often gives rise to considerable difficulties.

In German Patent No. 944,014, it has been proposed to use metal phenolate (phenate) catalysts for alkylation at the nucleus. Although these metal phenolate catalysts have only a feeble corroding action, the removal of the catalyst from the alkylated mixture still gives rise to considearble difficulties, particularly because it is necessary in the catalyst removal to avoid using acids for splitting the metal phenolates, owing to their isomerizing action on the reaction products.

It has been disclosed further in British Patent No. 325,855 that ortho- and para-cresol may be reacted with propylene in the presence of catalysts which have the effect of splitting off water, to form a mixture of various isopropyl derivatives. In this process, using an aluminum oxide catalyst which has been pressed until only moist and then dried, three isomers each alkylated once in the nucleus are obtained in the gaseous phase as reaction products of ortho-cresol and propylene. In these isomers, the propyl radicals have entered the nucleus in the ortho-meta- and para-positions to the hydroxyl group of the cresol, and the isomers so-produced cannot be isolated from one another in pure form by fractional distillation. Dipropylated cresols are formed in addition to the above-noted monoalkylated isomers. The course of the reaction is, therefore, very non-uniform in the gaseous phase i.e. with respect to the selective production of a particular isomer.

On the other hand, it has been disclosed in U.S. Patent No. 2,430,190 (especially Examples 1 and 2), that phenol does not react with propylene in the presence of aluminum oxide in the temperature range of 150 to 200 degrees C. in the liquid phase. Reaction occurs only after the addition of halogen compounds, for example hydrogen chloride or isopropyl chloride, but the reaction consists predominantly of etherification at the oxygen atom of the hydroxy group.

It is an object of the present invention to overcome the foregoing drawbacks and to provide a process for selective ortho-alkylation of phenols with olefins in the presence of gamma-aluminum oxide as catalyst.

Other and further objects of the invention will become apparent from the within specification and accompanying examples.

It has been found in accordance with the present invention that ortho-alkylphenols may be produced in a simple manner and in good yields and with a uniform reaction by treating phenols with olefins in the presence of a catalyst, if gamma-aluminum oxide is used as catalyst and the reaction is carried out in the liquid phase.

In view of the prior art, it was by no means to be expected and therefore extremely surprising to find that ortho-alkylphenols may be obtained in good yields from phenols and olefins in the liquid phase in the specific presence of gamma-aluminum oxide catalysts. Significantly, on the other hand, other aluminum oxides are not suitable.

Olefins suitable for the process in accordance with the invention are generally unsaturated compounds of the aliphatic, alicyclic, or araliphatic series with olefinic double bonds. Typical representatives are those compounds containing ethylenic unsaturation, such as ethylene, propylene, butylene, pentene, hexene, cyclopentene, cyclohexene and styrene. It is particularly advantageous to use lower olefins, such as those occurring in modern catalytic cracking processes, e.g. ethylene, propylene, and the isomeric butenes, such as 1- or 2-butene.

The catalysts which are effective in the process of the invention are aluminum oxides consisting entirely or mainly of gamma-aluminum oxide. These catalysts are obtained by precipitating hydrates of aluminum oxide from aqueous salt solutions by methods known per se, for example by treating an aluminum nitrate solution with ammonia (see Germany Patent No. 449,730) or a sodium aluminate solution with nitric acid, and heating the gels obtained after drying to temperatures ranging between 400 and 1000 degrees C., especially 450 and 700 degrees C. Heating the aluminum oxides to the said temperature range is an essential preliminary treatment, because it is necessary for activating the aluminum oxide so that it will catalyze the ortho-alkylation of the phenols in accordance with the process of the invention, and for producing the gamma-form of the aluminum oxide. The heat treatment may be carried out either in a current of air or in a current of inert gas such as nitrogen and should last generally about 1 to 10 hours.

The fact that catalytic activity for the ortho-alkylation is a specific property of gamma-aluminum oxide, which other compounds capable of splitting off water do not possess, is shown from the behavior of mixed catalysts composed of aluminum oxide and silicon dioxide. Whereas mixed catalysts of the latter type (containing for example 5 to 6% $SiO_2$ and pretreated in the same manner as aluminum oxide) give only very low phenol yields, the catalysts used in technical cracking processes (which contain about 80 to 90% $SiO_2$) give rise to mixtures of various isomeric alkyl phenols in which the ortho-compounds are present only in relatively small proportions.

The aluminum oxide catalysts may be used either in the form of coarse particles or as fine powders. Granular materials are suitable particularly as solid bed catalysts, whereas powdered catalysts are preferably used for discontinuous or batch processes, or where the reaction is carried out in a liquid fluidized bed.

The optimum temperature for carrying out the alkylation depends on the individual olefins. In general, temperature ranges of 200 to 400 degrees C., and especially 250 to 350 degrees C. will be used, but lower and even higher temperatures may also be employed.

The pressure in the reaction vessel may be varied within wide limits. It is advantageous to operate under a pressure which is greater than the total pressure of the reaction components at the particular temperature. Pressures between 5 and 500 atmospheres, preferably between 30 and 200 atmospheres, above atmospheric pressure will generally be suitable.

In the process according to the invention, the phenol which is to be alkylated is placed in a suitable pressure vessel, the aluminum oxide catalyst is added, and the olefinic components are then added under pressure at elevated temperatures. To ensure thorough mixing of the gas and liquid, as well as to effect uniform distribution of the catalyst in the reaction mixture, it is advantageous to shake or stir the contents of the autoclave by suitable agitation means.

The ratio of olefin to phenol will vary from case to case. It depends mainly on the reaction product desired and on the degree of conversion sought. If only one alkyl radical is to be introduced into the phenol nucleus in ortho-position to the hydroxyl group, approximately equimolar quantities of phenols and olefins will be used. Phenols substituted in both ortho-positions may be produced by using excess olefin. In that case, it will be advantageous to use 2 to 3 mols of olefin per mol of phenol.

The quantity of catalyst to be used depends on the form in which it is applied and on the manner in which the process of the invention is carried out. In a discontinuous or batch method, 0.1 to 30% by weight of aluminum oxide, calculated on the phenol to be alkylated, will generally be used. It is particularly advantageous to use 0.5 to 10%. More specifically, the ratio of catalyst to phenol by weight may be broadly stated as 0.001–0.3:1, and more preferably as 0.005–01:1. In the continuous method, 0.1–50, and preferably 1 to 25 parts by weight of the starting reaction mixture per part by weight of fixed bed catalyst will be converted in one hour. Generally, one part by weight of phenol may be converted per hour in the continuous method where the catalyst is present in the broad range of 0.02–10 parts by weight per part per hour of phenol passed therethrough, and more particularly the ratio may be 0.04–1:1 per hour of catalyst to phenol. Stated another way, the phenol may be passed per hour through the fixed bed catalyst at a ratio of 0.1–50:1 and more particularly 1–25:1 parts by weight phenol:catalyst for total conversion.

The alkylate may be worked up in a simple manner by filtering off the catalyst, which may be used again for fresh batches. To isolate the pure alkylated product, the usual separating process, such as fractional distillation, crystallization, etc., may be used if required.

The process may be carried out in batches or continuously as the artisan will appreciate. In the continuous operation, the catalyst (in a finely divided form) together with the phenol is pumped through the reactor and olefin is added at the same time. In another method of carrying out the continuous process, the reaction components may be passed over the catalyst arranged in a solid or fixed bed.

It will be appreciated that phenols selectively alkylated in the ortho-position to the hydroxyl group are obtained by the process according to the invention. Heretofore, these ortho-alkylphenols could only be obtained in a mixture with their position isomers by random alkylation of phenols, and they could only be isolated in pure form from this mixture only by complicated and expensive methods. The catalysts used in accordance with the process of the invention, on the other hand, are so specifically ortho-directing that the resulting ortho-alkylphenols are practically free from other position isomers, and in many cases they may be utilized technically or put into further processes directly after removal of unreacted phenols, without further purification.

The process of the invention has decided advantages over the process of the aforementioned German Patent No. 944,014, in which ortho-alkylphenols may also be obtained. Firstly, the continuous alkylation with a solid bed aluminum oxide catalyst is technically much easier to carry out than, for example, alkylation using a phenol-aluminum phenolate suspension, which is sensitive to air and moisture and which, moreover, has an undesirable tendency to crystallize. Removal of the catalyst in the process according to the invention, if suspended in the reaction mixture, is effected by simple filtration at the end of a discontinuous operation, or may be completely omitted when working with a solid bed catalyst, whereas in the case of the reaction products obtained by the process of said German Patent No. 944,014, the metal phenolate must be decomposed by treatment with aqueous media and subsequently separated.

An essential advantage of the process of the invention is due to the fact that mono-o-alkylphenols may be obtained in excellent yields without the formation of large quantities of 2,6-dialkylphenols, by merely adjusting the molar ratio of phenol to olefin so as to favor mono alkylation. This is shown in the Table I, which gives the yields of 2-isopropylphenol obtainable from phenol and propylene for various phenol conversions by each of the two processes when carried out under the optimum conditions for mono-alkylation.

The ortho-alkylphenols easily obtained by the process of the invention are known and are valuable antoxidants and stabilizers. They may be used also as intermediate products for the preparation of compounds for these purposes, and for the preparation of emulsifiers, raw materials for detergents, insecticides and dyestuffs.

EXAMPLE 1

188 parts by weight of phenol are heated in an autoclave at 280 degrees C. with 10 parts by weight of a pulverized γ-aluminum oxide catalyst. The catalyst is obtained by precipitating an aqueous aluminum nitrate solution with ammonia (see Z. anorg. Chemie 188, 378 (1930)), drying the salt-free hydrate of the oxide at 150 degree C., and then heating in a current of air at 450 degrees C. for 5 hours. Then, 84 parts by weight of liquid propylene are pumped into this mixture of phenol and catalyst.

*Table I*

| Catalyst | Amount of catalyst, percent of phenol | Temperature, deg. | Pressure, atm. | Reaction Time, min. | Molar ratio phenol:olefin | Conversion, percent | Yield in percent of the theoretical value of the converted phenol 2-isopropylphenol | 2,6-diisopropylphenol |
|---|---|---|---|---|---|---|---|---|
| Al-phenolate | 12 | 250 | 10 | 161 | 1:1 | 44 | 85 | 14 |
| Do | 12 | 250 | 52–20 | 191 | 1:1 | 57 | 76 | 22 |
| γ-Al₂O₃ | 5.3 | 280 | 80–15 | 175 | 1:1 | 67 | 96 | 4 |
| γ-A₂lO₃ | 5.3 | 280 | 95–20 | 188 | 1:2 | 86 | 82 | 15 |

The contents of the autoclave are stirred for 3 hours at 280 to 300 degrees C., the pressure in the reaction vessel falling from 198 to 22 atmospheres above atmospheric pressure (atmospheres gage). After cooling, the pressure is released from the autoclave and the catalyst is filtered from the liquid reaction product (265 parts by weight). Gas chromatographic analysis shows the reaction product to have the following composition:

| | Percent |
|---|---|
| Phenol | 21.8 |
| 2-isopropylphenol | 63.3 |
| 2,6-diisopropylphenol | 12.1 |
| Other diisopropyl phenols | 2.5 |
| 2,4,6-triisopropylphenol | 0.3 | meta- and para-isopropylphenols could not be detected.

EXAMPLE 2

3 mols phenol and 3 mols propylene are reacted at 300 degrees C. by the process described in Example 1. Equal dosage parts by weight (15 g. each) of aluminum oxides pretreated in various ways (by varying the drying temperature and time) are introduced as catalysts.

The reaction time is 3 hours. The experimental results shown in Table II below indicate clearly the fall in catalyst activity which occurs when the aluminum oxide is heated at temperatures below or above the optimum range which is critical for the formation of gamma-aluminium oxide.

Table II

| Pretreatment of the Al₂O₃ | Yield of liquid reaction product in gms. | Pressure fall initial pressure 220 atm. | Composition of the liquid reaction product in percent by weight | | | | | | |
|---|---|---|---|---|---|---|---|---|---|
| | | | Phenol | Isopropyl phenol | | Isopropyl-phenyl-ether | 2,6-diiso-propyl-phenol | Other diisopropyl phenols | 2,4,6-triisopropyl-phenol |
| | | | | o- | m- and p- | | | | |
| 3ʰ/250–280° C | 302 | 40 | 79.5 | 13.8 | 2.3 | 2.2 | 1.6 | 0.5 | |
| 2ʰ/450° C | 397 | 168 | 21.8 | 62.9 | | | 12.4 | 2.5 | 0.3 |
| 5ʰ/700° C | 399 | 210 | 35.9 | 50.5 | 0.5 | 1.4 | 10.8 | 0.8 | |
| 6ʰ/1000° C | 323 | 120 | 66.7 | 26.7 | | 1.7 | 4.1 | 0.7 | |
| 5ʰ/1300° C | 307 | 37 | 81.1 | 18.3 | | 0.5 | | | |

ʰ = hours.

EXAMPLE 3

Commercial γ-aluminum oxide, formed into pellets of 5 mm. diameter and activated by heating to 450 to 500 degrees C. in a current of air, is arranged as a solid catalyst bed in two cylindrical pressure vessels arranged in series connection one behind the other. Phenol and technical n-butene are pumped in a ratio by weight of 3:2 into the first reactor with the aid of two liquid dosing pumps. The product is removed continuously from the second reaction vessel by releasing pressure through a valve in such an amount that a pressure of 90 to 100 atmospheres is established in the reaction chamber. With a throughput of 3 parts by weight of starting product per part by weight of catalyst per hour, 97 to 99% of the butene is converted. The reaction product has the following composition:

| | Percent |
|---|---|
| Phenol | 22.0 |
| o-Sec.-butylphenol | 60.2 |
| m- and p-Sec.-butylphonol | 1.2 |
| Sec.-butyl-phenyl ether | 0.2 |
| 2,6-di-sec.-butylphenol and | 11.6 |
| Other dibutylphenols | 4.6 |

EXAMPLE 4

Using the same apparatus and catalyst as in Example 3, phenol and ethylene in a ratio of 1:3 are reacted at 300 degrees C. and 100 atmospheres pressure.

Using a throughput speed of 0.9 part by weight of phenol per part by weight of catalyst per hour, an alkylate is obtained which a fractional distillation yields 38% phenol, 47% o-ethylphenol (B.P. at 50 mm. Hg 120 degrees C.) and 15% 2,6-diethylphenol (B.P. at 50 mm. Hg 138° C.).

EXAMPLE 5

Using the same process as in Example 1 and the same aluminium oxide catalyst, 188 parts by weight of phenol are reacted with 166 parts by weight of propylene in the presence of 10 parts by weight of catalyst at a temperature of 293–300° C. The pressure is raised to 150 atm. and falls to 20 atm. at the end of the reaction. After 3 hours, 320 parts by weight of reaction product, liquid at room temperature, are obtained; the product has the following composition:

| | Percent |
|---|---|
| Phenol | 4.1 |
| o-Isopropylphenol | 45.4 |
| 2,6-diisopropylphenol | 42.0 |
| Other diisopropylphenols | 2.9 |
| 2,4,6-triisopropylphenol | 4.8 |

EXAMPLE 6

188 parts by weight of phenol and 10 parts by weight of the aluminium oxide described in Example 1 are heated to 280 degrees C. in an autoclave with stirrer, and 164 parts by weight of cyclohexene are pumped into the mixture. The pressure is initially 35 atm. and falls to 23 atm. during the reaction. After stirring for 4 hours at 300 degrees C., the mixture is cooled to room temperature and the catalyst is removed by filtration. The filtrate (320 parts by weight) is fractionally distilled. 54 parts by weight of cyclohexene (B.P. at 760 mm. Hg 81° C.), 81 parts by weight of phenol (B.P. at 10 mm. Hg 72° C.) and 170 parts by weight o-cyclohexylphenol (B.P. at 10 mm. Hg 148° C., M.P. 57° C.) are thereby obtained.

EXAMPLE 7

752 parts by weight of phenol and 40 parts by weight of powdered aluminum oxide described in Example 1 are heated to 270° C. in an autoclave with a magnetically operated stirring device, and 450 parts by weight of technical n-butene is pumped in in the course of one hour by means of a liquid dosing pump. In the process, the temperature is gradually raised to 300° C., and stirring is then continued for a further two hours at 300° C. The pressure is initially 78 atm. and falls to 20 atm. during the reaction. After the autoclave has cooled to 20° C. and the pressure has been released and the catalyst has been filtered off, 1040 parts by weight of liquid reaction product of the following composition remain:

| | Percent |
|---|---|
| Phenol | 14.3 |
| o-Sec. butylphenol | 79.3 |
| 2,6-di-sec. butylphenol | 2.2 |
| 2,4-di-sec.-butylphenol+tri-sec.-butylphenol | 1.7 |

EXAMPLE 8

The procedure of Example 6 is repeated but in this case the cyclohexene is replaced by styrene. Similar results are achieved whereby ortho-phenyl-ethyl-phenol of the boiling point 130–135° C. at 0.5 mm. pressure is obtained.

What is claimed is:

1. Process for the production of phenols alkylated in ortho-position to the hydroxyl group which comprises reacting phenol and an olefin in liquid phase in the presence of gamma-aluminum oxide as catalyst, and recovering the reaction product.

2. Process according to claim 1 wherein the reaction is carried out at a temperature between about 200–400° C. and a pressure between about 5–500 atmospheres gage, the phenol and olefin being present in equimolar amounts whereby mono-ortho-alkyl phenol is obtained.

3. Process according to claim 1 wherein the reaction is carried out at a temperature between about 200–400° C. and a pressure between about 5–500 atmospheres gage, a molar excess of olefin being used whereby phenols alkyl-substituted in both ortho positions are obtained.

4. Process according to claim 1 wherein said process is a batch process and between about 0.1 and 30% by weight of the aluminum oxide based on the phenol used is present.

5. Process according to claim 1 wherein the process is carried out continuously with the catalyst in the form of a fixed bed and with the phenol and olefin continuously being passed therethrough and wherein the catalyst is used in an amount of parts by weight per part by weight of phenol per hour of from 0.02–10:1.

6. Process according to claim 1 wherein the catalyst is suspended in the reactants and the alkylated phenol is separated therefrom by filtration and isolated by fractionation.

7. Process for producing mono-ortho-alkylated phenol which comprises contacting phenol and a hydrocarbon having mono-ethylenic unsaturation selected from the group consisting of ethylene, propylene, butylene, pentene, hexene, cyclopentene, cyclohexene and styrene in equimolar amounts in the presence of gamma-aluminium oxide as catalyst in a weight ratio to phenol of 0.001–0.3:1 in a batch process at an elevated temperature and a pressure at which the reaction proceeds in the liquid phase at the particular temperature, and recovering the mono-ortho-alkylated phenol thereby formed.

8. Process for producing mono-ortho-alkylated phenol which comprises contacting phenol and a hydrocarbon having mono-ethylenic unsaturation selected from the group consisting of ethylene, propylene, butylene, pentene, hexene, cyclopentene, cyclohexene and styrene in equimolar amounts in the presence of gamma-aluminum oxide as catalyst in a weight ratio to phenol of 0.02–10:1 per hour in a continuous process at an elevated temperature and a pressure at which the reaction proceeds in the liquid phase at the particular temperature, and recovering the mono-ortho-alkylated phenol thereby formed.

9. Process for producing di-ortho-alkylated phenol which comprises contacting phenol with a molar excess of a hydrocarbon having mono-ethylenic unsaturation selected from the group consisting of ethylene, propylene, butylene, pentene, hexene, cyclopentene, cyclohexene and styrene in the presence of gamma-aluminium oxide as catalyst in a weight ratio to phenol of 0.001–0.3:1 in a batch process at an elevated temperature and a pressure at which the reaction proceeds in the liquid phase at the particular temperature, and recovering the 2,6-dialkylated phenol thereby formed.

10. Process for producing di-ortho-alkylated phenol which comprises contacting phenol with a molar excess of a hydrocarbon having mono-ethylenic unsaturation selected from the group consisting of ethylene, propylene, butylene, pentene, hexene, cyclopentene, cyclohexene and styrene in the presence of gamma-aluminum oxide as catalyst in a weight ratio to phenol of 0.02–10:1 per hour in a continuous process at an elevated temperature and a pressure at which the reaction proceeds in the liquid phase at the particular temperature, and recovering the 2,6-dialkylated phenol thereby formed.

References Cited by the Examiner

UNITED STATES PATENTS

| | | | |
|---|---|---|---|
| 2,125,310 | 8/1938 | Perkins | 260—624 |
| 2,360,814 | 10/1944 | Mattox | 260—671 X |
| 2,448,942 | 9/1948 | Winkler et al. | 260—621 |
| 2,450,766 | 10/1948 | Nixon et al. | 260—624 |
| 2,678,951 | 5/1954 | Smith et al. | 260—621 |

OTHER REFERENCES

Ipatieff: "Catalytic Reactions at High Temperatures and Pressures," pp. 664–668 (5 pages), pub. by the Macmillan Co., New York (1936).

Newsome, J. W.: "Aluminum Properties," Alcoa, Pennsylvania (1960), No. 10.

LEON ZITVER, *Primary Examiner.*

H. G. MOORE, D. M. HELFER, *Assistant Examiners.*

UNITED STATES PATENT OFFICE
CERTIFICATE OF CORRECTION

Patent No. 3,290,389            December 6, 1966

Willi Hahn

It is hereby certified that error appears in the above numbered patent requiring correction and that the said Letters Patent should read as corrected below.

Column 3, line 32, for "0.005-01:1" read -- 0.005-0.1:1 --; column 5, line 60, for "butylphonol" read -- butylphenol --.

Signed and sealed this 19th day of September 1967.

(SEAL)
Attest:

ERNEST W. SWIDER            EDWARD J. BRENNER
Attesting Officer            Commissioner of Patents